United States Patent Office 3,414,092
Patented Dec. 3, 1968

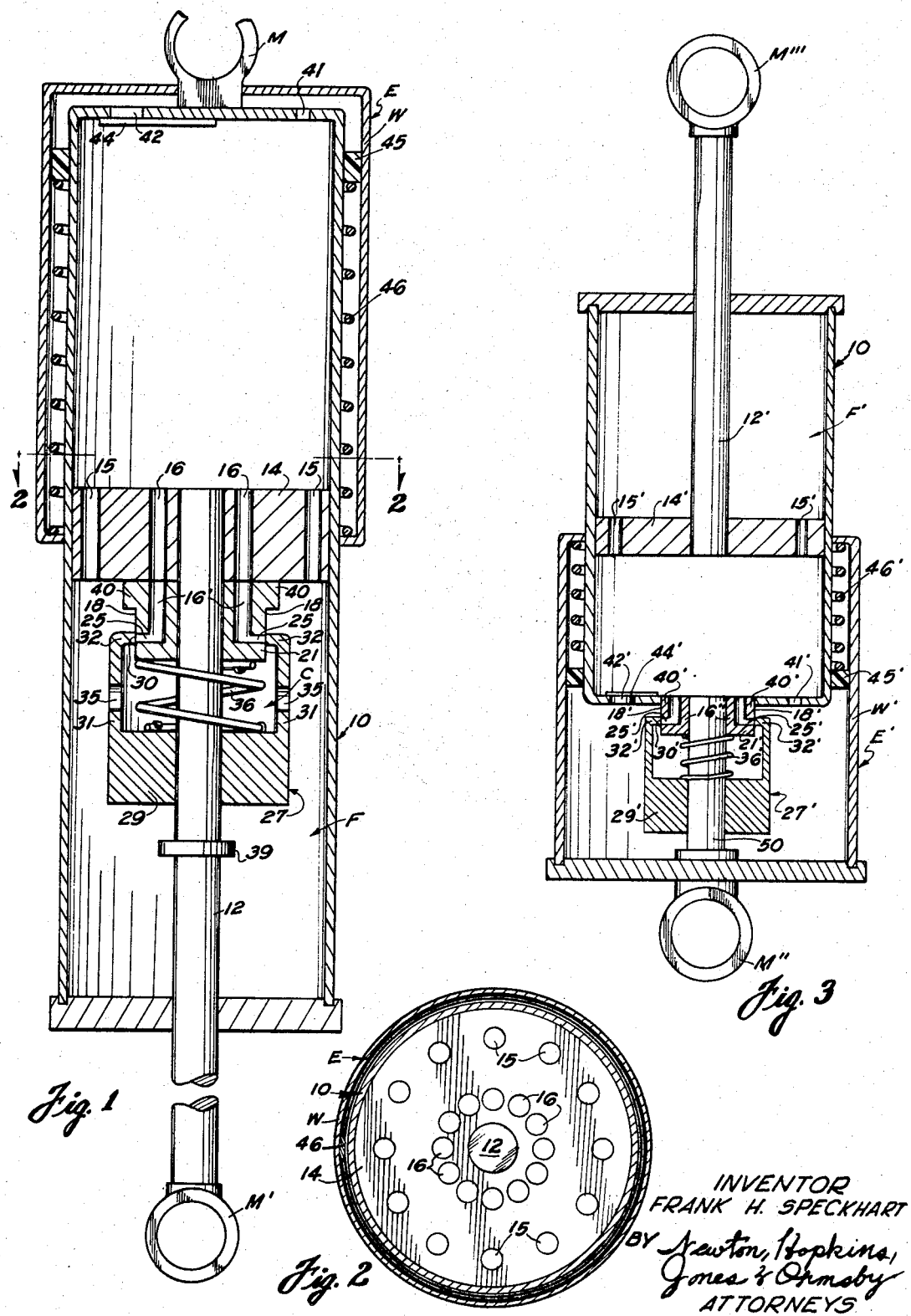

3,414,092
SHOCK ABSORBING DEVICE
Frank H. Speckhart, 84 Cornelia Drive,
Rochester, N.Y. 14606
Filed Jan. 3, 1967, Ser. No. 607,025
4 Claims. (Cl. 188—100)

ABSTRACT OF THE DISCLOSURE

This is a method of and apparatus for controlling the damping of movement of the unsprung mass of a vehicle with respect to the sprung mass of the vehicle in response to the time rate of change in velocity of the unsprung mass to reduce the amount of "jerk" or time rate of change of acceleration transmitted from the unsprung mass to the sprung mass of the vehicle. The shock absorbing device has a conventional fixed opening through the piston thereof for the passage of fluid therethrough and a valve which opens in response to acceleration of the unsprung mass of a vehicle to reduce the damping ability of the shock absorbing device.

---

This invention relates generally to hydraulic shock absorbing devices and more particularly to one which changes its damping value in response to acceleration of the unsprung mass of a vehicle.

Many shock absorbing devices are in use on vehicles today attempting to provide a comfortable ride for occupants of the vehicle. One such prior art shock absorbing device utilizes a cylinder having therein hydraulic fluid and a reciprocal piston having a fixed opening therethrough. Since the damping ability of these prior art shock absorbing devices was a function of the fixed opening, the force transmitted from the unsprung mass of the vehicle (the wheel and/or the axle assembly) to the sprung mass of the vehicle (the body portion carried by the springs) had a direct relationship to the relative velocity of the two masses. Therefore, when a large shock force was applied to the unsprung mass of the vehicle, a large portion thereof was transmitted to the sprung mass of the vehicle which served to impart a sudden upward movement to the sprung mass thereby subjecting the occupants of the vehicle to undesirable jarring.

Subsequently, however, it was found that greater riding comfort for the occupants of the vehicle could be achieved if the damping ability of the shock absorbing device was reduced in response to the force transmitted from the unsprung mass to the sprung mass. Such a shock absorbing device was achieved by providing, in addition to the fixed opening through the piston carried in the cylinder of the device, a pressure activated valve in the piston which opened to reduce the damping coefficient of the device when a predetermined pressure was attained by the hydraulic fluid in the cylinder. Therefore, as a result of a large shock force applied to the unsprung mass of the vehicle, the pressure activated valve opened and reduced the damping coefficient of the device which in turn reduced the force transmitted to the sprung mass of the vehicle. Although those subsequently developed shock absorbing devices did serve to substantially improve the riding comfort for occupants of the vehicle, the devices were not completely satisfactory in achieving the greatest riding comfort for the occupants of the vehicles since the time lag necessary to open the pressure activated valve in the piston to reduce the damping coefficient of the device was sufficient to transmit a large initial "jerk," which is defined technically as the time rate of change of acceleration, to the occupants when a sudden shock force was applied to the unsprung mass of the vehicle.

This invention overcomes these and other problems associated with prior art shock absorbing devices by providing a shock absorbing device which reduces the amount of "jerk" or time rate of change of acceleration transmitted from the unsprung mass to the sprung mass of a vehicle and thus to the occupants of the vehicle so as to greatly increase the riding comfort of the occupants.

The apparatus of the invention comprises a shock absorbing device including a cylinder having a piston therein with a fixed opening therethrough through which fluid is allowed to pass as the piston is moved and in addition thereto has a varible opening which is adjusted in response to acceleration of the unsprung mass of the vehicle rather than in response to the attainment of a predetermined pressure in the cylinder. The valve of the invention which adjusts a variable opening within the piston or cylinder, whichever is connnected rigidly to the unsprung mass, is normally spring biased closed and opens under the inertial tendency of the valve body to remain at rest when a force accelerates the unsprung mass. This serves to reduce the amount of "jerk" transmitted to the sprung mass of the vehicle when sudden force imparts an acceleration to the unsprung mass of the vehicle, resulting in greater riding comfort to the occupants carried by the sprung mass of the vehicle.

Moreover, since the apparatus of the invention serves to absorb more energy than prior art shock absorbing devices which allow the same approximate softness of ride, the apparatus of the invention could be used to better stabilize the vehicle so as to appreciably improve the handling characteristics of the vehicle during its operation.

These and other features and advantages of the present invention will become more clearly understood upon consideration of the following specification and accompanying drawings wherein like characters of reference designate corresponding parts throughout and in which:

FIG. 1 is a longitudinal cross-sectional view of a shock absorbing device embodying the invention;

FIG. 2 is a cross-sectional view taken along the line 2—2 in FIG. 1;

FIG. 3 is a longitudinal cross-sectional view of a second shock absorbing device embodying the invention;

Figure 4:
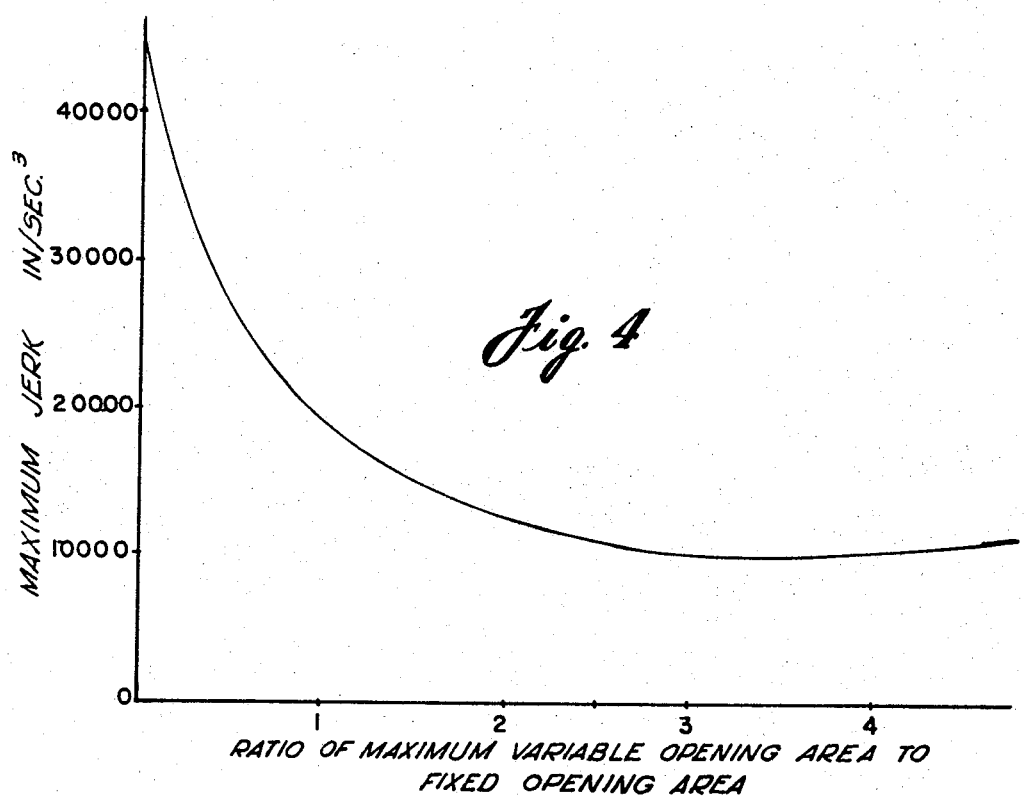
FIG. 4 is a graph illustrating the amount of "jerk" transmitted to the sprung mass of a vehicle at different ratios of fixed openings to variable openings in a shock absorber.

These figures and the following detailed description disclose specific embodiments of the invention; however, the inventive concept is not limited thereto since it may be embodied in other specific forms.

Referring to FIG. 1, it will be seen that the apparatus of the invention comprises generally a cylinder 10 having an appropriate mounting bracket M at one end thereof for attachment to the sprung mass of the vehicle (not shown) and having a piston rod 12 slidably received through the other end thereof and which carries a piston 14 fixed thereon. The exteriorally extending end of the piston rod 12 has an appropriate mounting bracket M' thereon for attachment to the unsprung mass of the vehicle (not shown).

The piston 14 is a disc-shaped member which is capable of slidably traveling along the length of the inside of the cylinder 10 in sealing engagement with the wall thereof to prevent the passage thereby of hydraulic fluid contained within the cylinder 10. The piston 14 has a plurality of longitudinally extending fixed openings 15 therethrough within the circumference thereof through which hydraulic fluid may pass as the piston 14 moves along the length of the cylinder 10. Located inwardly of the openings 15 and concentrically therewith are a plurality of longitudinally extending passages 16.

An inertial valve 27 is carried by the piston rod 12 below the piston 14 and includes a movable valve body 29 slidably carried on the piston rod 12 and a boss 21 carried by the piston 14 having passages 16' which communicate with the passages 16 through the piston 14 and radially extending ports 25 which opens onto the outer cylindrical surface 18 formed by the boss 21. The valve body 12 is cylindrical in shape and has provided around the upper edge thereof, an annular flange 31 extending upwardly therefrom and having an inwardly turned flange valve portion 32 at the upper edge thereof. The flange portion 32 defines an aperture 30 therethrough having substantially the same size as the outside diameter of the boss 21 extending downwardly from the bottom of the piston 14. The flange portion 32 is effective to just cover the outer open end of the radial ports 25 when properly positioned and the flange 31 is of sufficient length to provide a cavity C below the boss 21 when the flange portion 32 is covering the ports 25. A plurality of discharge ports 35 are provided through the flange 31 to allow the cavity C to communicate with the fluid chamber F defined in the cylinder 10.

A spring 36 attached to the bottom of the boss 31 carries the valve body 27 by attachment to the bottom of the cavity C and is effective, when the piston 14 is stationary, to position the valve body 27 so that the flange portions 32 cover the open ends of the radial ports 25.

A stop 39 is carried by the piston rod 12 below the valve body 29 and is effective to contact the valve body 29 as it moves downwardly with respective to the piston 14. This is effective to stop the downward movement of the valve body 29 when the outer open ends of the radial ports 25 have been uncovered by the flange portion 32. A shoulder 40 is provided by the boss 21 and is effective to engage the flange portion 32 as the valve body 29 moves upwardly. This is effective to stop the upward movement of the valve body 29 with respect to the piston rod 12 when the upward movement of the valve body 29 has uncovered the outer ends of the ports 25. It will be seen then, that as the piston rod 12 is accelerated upwardly by the unsprung mass of the vehicle, the valve body 29 tends to remain in the same relative position so that the piston rod 12 moves upwardly with respect to the valve body 29 to uncover the radially extending ports 25 and reduce the damping ability of the shock absorbing device. As the piston rod 12 is accelerated downwardly, it will be seen that the valve body 29 again tends to remain in the same relative position so that the piston rod 12 moves downwardly with respect to the valve body 29 again uncovering the ports 25 to reduce the damping ability of the shock absorbing device.

As is well known in the art, an excess fluid chamber E is provided at the upper end of the cylinder 10 by an outer side wall W extending around the cylinder 10 and closed at the bottom and top thereof. A passage 41 is provided through the top of the cylinder 10 which permits some of the hydraulic fluid to flow therethrough as the piston 14 is moved upwardly and a discharge aperture 42 having a check valve 44 thereover is provided through the top of the cylinder 10 which permits the fluid to be rapidly drawn back into the cylinder 10 as the piston rod 14 is moved downwardly. This excess fluid chamber E is necessary since the cylinder 10 is completely filled with hydraulic fluid and as the piston rod 12 moves upwardly the space within the cylinder 10 which the hydraulic fluid may occupy is reduced by the volume of the piston rod 12 in the cylinder 10. An annular seal 45 encircles the cylinder 10 and slidably seals the cylinder 10 with respect to the outer wall W. A spring 46 is positioned below the seal 45 which serves to urge the fluid pushed into the excess fluid chamber E during the upward stroke of the piston 14 back into the cylinder 10 as the piston 14 moves downwardly again thereby increasing the effective fluid volume necessary to fill the inside of the shock absorbing device.

Referring to FIG. 3, a second embodiment of a shock absorbing device embodying the invention is shown which has the inertial valve 27' attached to the cylinder 10' rather than to the piston rod 12'. In this embodiment the mounting bracket M" is attached to the unsprung mass of the vehicle (not shown) and the mounting bracket M'" on the exteriorally extending end of the piston rod 12' is attached to the sprung mass of the vehicle (not shown). Therefore, it is necessary to attach the valve body 27' to the cylinder 10' rather than the piston rod 12' since the cylinder 10' rather than the piston rod 12' is connected to the unsprung mass. The piston 14' has a plurality of fixed openings 15' therethrough which serve the same purpose as the fixed openings 15 in the piston 14 of the first embodiment of the invention. A boss 21' extends downwardly from the cylinder 10' and into the excess fluid chamber formed by the outer wall W'.

The valve 27' has a valve body 29' and is similar in construction to the valve body 29 of the first embodiment of the invention and is attached to the boss 21' by means of a spring 36'. The valve body 29' is carried on a guide post 50 mounted between the cylinder 10' and the outer wall W' in the same manner as the valve body 29 is mounted on the piston rod 12 in the first embodiment of the invention. Therefore, it will be seen that the operation produces substantially the same effect in the second embodiment of the invention as in the first embodiment of the invention.

The passage 41', the aperture 42' and the check valve 44' in the second embodiment of the invention operate as in the first embodiment of the invention. From the foregoing, then, it will be seen that only the construction and not the operation of the invention is changed for the second embodiment of the invention.

*Design characteristics*

In designing conventional shock absorbing devices utilizing a pressure activated valve to reduce the damping coefficient of the device, the design parameters have usually been the area of the fixed opening, the area of the opening in the pressure activated valve, and the pressure at which the valve opens.

In the design of the present invention, however, the parameters of the area of the fixed opening, the area of the variable opening, the natural frequency of the inertial valves, and the initial spring tension of the springs of the inertial valves are used. The total cross-sectional area of the fixed openings 15 through the piston 14 can easily be calculated in known manner using the same equation used to calculate the fixed opening in a conventional shock absorber.

The ratio of the total cross-sectional area of the passages 16 or ports 25 to the total cross-sectional area of the fixed opening 15 can be determined by trial and error until the minimum amount of "jerk" is achieved. One such solution was obtained analytically whereby on overshoot of approximately 50 percent was permitted for a step input. The plot of "jerk" against the ratio of the total cross-sectional area of the passages 16 to the total cross-sectional area of the fixed openings 15 of FIG. 4 shows that the maximum "jerk" transmitted by the device reached a minimum at a ratio of approximately 2.5 using a one inch unit step input. Therefore, the total cross-sectional area of the passages 16 or ports 25 in this embodiment of the invention were taken as two and one-half times the total cross-sectional area of the fixed openings 15. It is to be understood, however, that different values of step inputs may produce slightly different curve shapes so that the optimum area ratio may be a somewhat different value for other step inputs.

Figure 5:
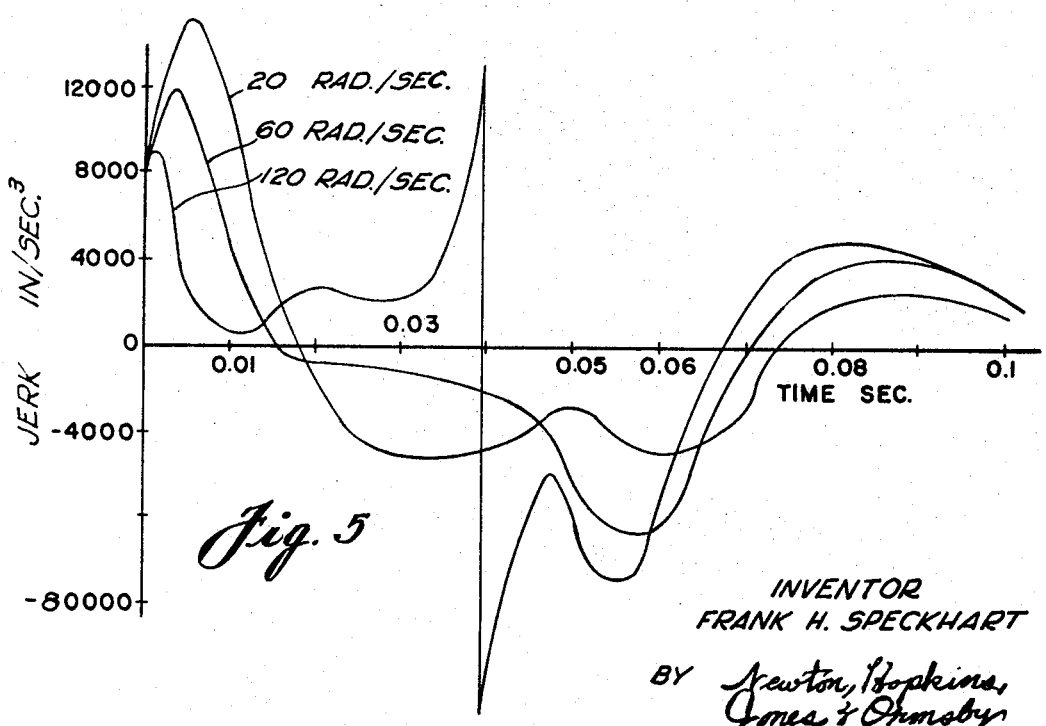
FIG. 5 is a graph illustrating the effect of the natural frequency of the inertial valve on the reduction of "jerk" experienced by the sprung mass of a vehicle.

The natural frequency of the valve 27 is an indication of how fast the valve will open and is therefore very important in the reduction of "jerk" although it has little effect on the amount of damping that the shock absorbing device develops. Since the reduction of "jerk" is one of the most important considerations of the present invention, the natural frequency of the valve 27 determines the performance of the shock absorbing device in the effective reduction of "jerk." The best frequency of the inertial valve 27 can be determined by trial and error. If the natural frequency of the valve is too high, then the valve will open too fast. This is effective to reduce the first peak of high jerk value but will cause a second peak of high jerk value. If the natural frequency of the valve is too low, then the valve will open too slowly. This is effective to prevent a second peak of high jerk value but will cause a first peak of high jerk value. Therefore, some intermediate natural frequency of the valve 27 must be selected to effectuate the best "jerk" reducing performance. A graph of "jerk" plotted against time for such a valve 27 is shown in FIG. 5 as determined analytically using the average values found on a medium weight automobile. As can be seen from the graph, values of 20 radians per second, 60 radians per second, and 120 radians per second were used as the natural frequencies of the valve 27 and the best natural frequency for this specific embodiment is seen to be 60 radians per second, it being understood that other natural frequencies may produce best "jerk" reducing performance for other embodiments of the invention.

The initial tension of the spring 36 of the inertially controlled valve 27 must be great enough to hold the valve closed in its rest position. Other than that, the particular initial tension of the spring 36 will depend on the application that the valve will have (i.e., a small amount of initial tension if a soft ride is desired and a large amount of initial tension if a hard ride is desired). In the particular example given, the weight of the valve body 29 was used as the initial tension force.

*Operation*

In operation of the invention, it will be seen that the mounting bracket M' attached to the extending end of the piston rod 12 is attached to the unsprung mass or wheel and axle assembly of the vehicle (not shown) and the mounting bracket M attached to the cylinder 10 is attached to the sprung mass or body of the vehicle (not shown). This is necessary since it is desirable that the large rate of change of acceleration or "jerk" which is always imparted to the unsprung mass of the vehicle will not be transmitted to the sprung mass of the vehicle easily.

Figure 6:
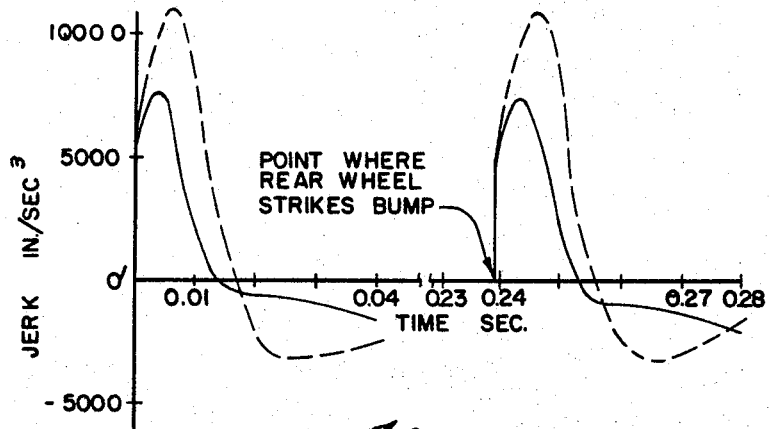
FIG. 6 is a graph illustrating the reduction of "jerk" accomplished, using one particular embodiment of the invention; and, FIG. 7 is a graph illustrating the energy absorbing characteristics of the embodiment of the invention shown in FIG. 1.

The instant a force is applied to the unsprung mass of the vehicle (not shown), the unsprung mass changes its "jerk" value or rate of upward acceleration carrying the piston rod 12 therewith. This also starts to move the piston 14 upwardly within the cylinder 10 so that hydraulic fluid within the cylinder 10 is forced through the fixed openings 15 in the piston 14. As the piston accelerates upward, the valve body 29 tends to remain at rest thereby opening the discharge ports 25 so that the dumping coefficient of the invention is reduced in accordance with the acceleration of the piston 14. This serves to reduce the damping coefficient of the present invention the instant that acceleration takes place which is before a substantial pressure is built up within the cylinder 10. This serves to provide a shock absorbing device which acts more quickly than prior art conventional shock absorbing devices having valves which had to be opened under pressure. "Jerk," as well as acceleration, transmitted to the sprung mass is thereby reduced. This can be best seen by reference to FIG. 6 of the accompanying drawings wherein the amount of "jerk" imposed on the sprung mass of the vehicle when a conventional shock absorbing device having a fixed opening through the piston thereof is used is plotted in a dashed line and the amount of "jerk" imposed on the sprung mass of a vehicle when the present device is used is plotted in a solid line. It should be noted that both the front and rear wheel plots are shown in FIG. 6.

Since the discharge ports 25 are directed radially outward perpendicular to the axis of the piston rod 12, the opening of the discharge ports 25 is completely independent of the pressure within the cylinder 10. Therefore, as the velocity becomes constant, the valve body 29 is moved upwardly by the spring 36 so as to close the discharge ports 25 and increase the damping coefficient of the present device.

As the motion of the piston rod 12 reaches its upper maximum position, the direction of movement thereof is reversed and the piston 14 starts being accelerated downwardly. The valve body 29 moves upwardly to uncover the ports 25 in the same manner as the valve body 29 moves downwardly as the piston 14 accelerates upwardly and serves to reduce the amount of jerk transmitted from the unsprung mass to the sprung mass of the vehicle when the unsprung mass of the vehicle starts accelerating downwardly on its return stroke. Therefore, it can be easily seen that the amount of jerk transmitted to the unsprung mass of the vehicle is substantially reduced both on the upward stroke of the piston and on the downward stroke of the piston.

Since the cylinder 10' is attached to the unsprung mass of the vehicle, the valve 27' operates in the same manner as the valve 27. Therefore, it can easily be seen from the above operation that the second embodiment of the invention performs in the same manner as the first embodiment of the invention.

Figure 7:
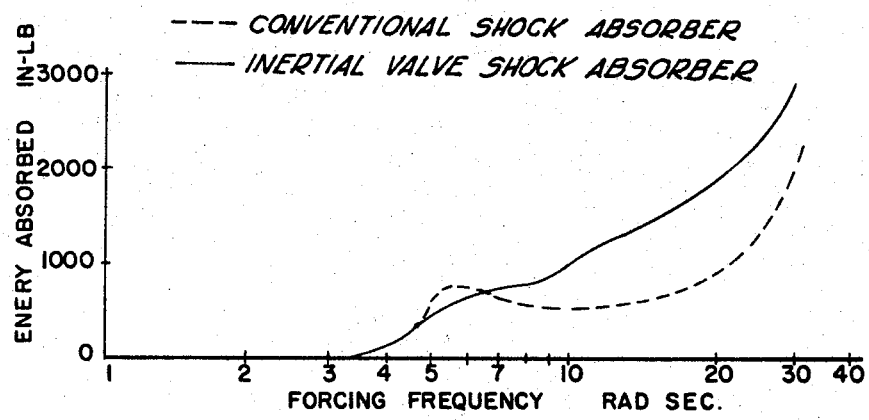

FIG. 7 illustrates the jerk and energy absorbing characteristics of the invention as compared to a conventional shock absorbing device for a sinusoidal input ($Z$=sine $\omega\ t$). At the higher frequencies, which correspond to frequencies that would be encountered by an automobile in normal service, "jerk" transmitted to the sprung mass by the invention is significantly less. At the same time, the invention absorbs more energy and therefore would provide better handling stability.

It will be obvious to those skilled in the art that many variations may be made in the embodiment of the invention herein shown without departing from the scope thereof as defined by the appended claims.

I claim:

1. A shock absorbing device for use between a sprung mass and an unsprung mass, said shock absorber including a cylinder attached to said sprung mass, a piston slidable within said cylinder, a piston rod fixed to said piston and attached to said unsprung mass, first passage means to allow fluid to flow from one side of said piston to the opposite side of said piston, second passage means to allow fluid to flow from said one side of said piston to said opposite side of said piston, and control means to control the flow of fluid through said second passage means, characterized in that said control means includes a boss on said opposite side of said piston, said piston having a plurality of second ports forming said second passage means, said second plurality of ports extending through said boss, an inertial valve surrounding said piston rod and adjacent to said boss, resilient means normally to retain said inertial valve in a contiguous relationship with said boss to block said second passage means, said inertial valve being slidable in a first direction relative to said piston rod in response to time rate changes in velocity of said piston rod to compress said resilient means and open said second passage means, said inertial valve being slidable in a second direction opposite to the direction of said first direction relative to said piston rod in response to time rate changes in velocity of said piston rod to expand said resilient means and open said second passage means.

2. A device according to claim 1 in which said resilient means comprises a coiled spring surrounding said piston rod, one end of said spring being attached to said inertial valve, the opposite end of said spring being attached to said boss.

3. A device according to claim 2 and including a first stop means to limit the travel of said inertial valve with respect to said piston rod in said first direction, and second stop means to limit the travel of said inertial valve with respect to said piston rod in said opposite direction.

4. A device according to claim 1, said piston having a first plurality of ports comprising said first passage means.

References Cited
UNITED STATES PATENTS

| | | | |
|---|---|---|---|
| 2,886,142 | 5/1959 | Orshansky | 188—88 |
| 3,114,705 | 12/1963 | Pribonic et al. | |
| 3,319,741 | 5/1967 | Hauck | 188—88 |
| 3,338,347 | 8/1967 | Avner | 188—88 |

MILTON BUCHLER, *Primary Examiner.*

GEORGE E. A. HALVOSA, *Assistant Examiner.*